Jan. 3, 1950 L. T. PARETI ET AL 2,493,692

SPINNING LURE FOR FISH

Filed Feb. 23, 1949

INVENTORS
LAWRENCE TONY PARETI &
ALEXANDER MANISTA
BY
Carl Miller
ATTORNEY

Patented Jan. 3, 1950

2,493,692

UNITED STATES PATENT OFFICE 2,493,692

SPINNING LURE FOR FISH

Lawrence Tony Pareti and Alexander Manista, Clifton, N. J.

Application February 23, 1949, Serial No. 77,858

2 Claims. (Cl. 43—42.51)

1

This invention relates to spinning lure for fish.

It is an object of the present invention to provide a spinning lure which is provided with laterally extending curved projections at the opposite side of the body to cause the spinning action of the lure as it is pulled through the water and wherein these curved portions extend for a substantial distance throughout the length of the body, one being connected at one side and to the bottom edge of the body while the other is connected to the other side and to the top edge of the body.

Other objects of the present invention are to provide a spinning lure for fish which is of simple construction, inexpensive to manufacture, formed of one piece, may be made either by casting or by stamping, and efficient in operation.

For other objects and for a better understanding of the invention, reference may be had to the following detailed description taken in connection with the accompanying drawing, in which Fig. 1 is a perspective view of a spinning lure formed by casting and embodying the features of the present invention.

Figures 1, 2, 3, 4, 5, 6:
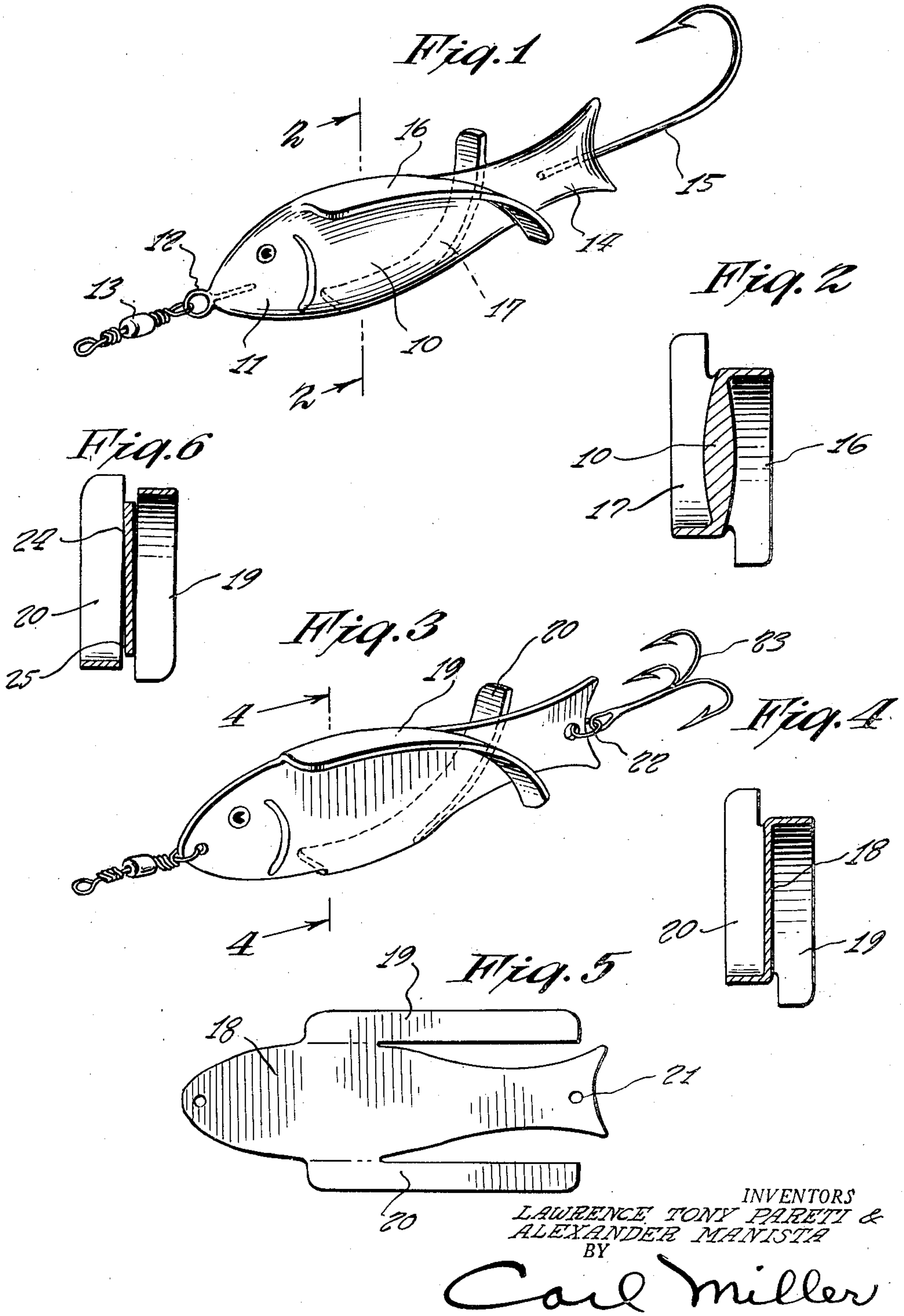
Fig. 2 is a vertical sectional view taken on line 2—2 of Fig. 1.
Fig. 3 is a perspective view of a modified form of lure which is made from a stamping.
Fig. 4 is a vertical sectional view taken on line 4—4 of Fig. 3.
Fig. 5 is a plan view of the die stamping from which the fishing lure shown in Fig. 3 is made.
Fig. 6 is a sectional view similar to Fig. 4 showing a still further form of the invention containing spaces between the fish body and the vanes.

Referring now particularly to Figs. 1 and 2, 10 represents a main body having a head 11 with an eye 12 thereon to which a swivel 13 is connected. The main body 10 has a rearwardly extending tail portion 14 to which there is connected a hook 15. The body 10 is of oval section and from the top edge thereof and extending to one side there is a rearwardly and downwardly curved spinning vane 16 extending a substantial distance throughout the length of the body 10. On the opposite side of the body 10 is another spinning vane, as indicated at 17, which extends along the bottom edge and is curved rearwardly and upwardly.

The tail portion of the body 10 is of less height than the main part thereof and the trailing ends of the vanes 16 and 17 project respectively from the lower and upper edges thereof. In operation, the lure when pulled through the water will be caused to spin due to the action of the water on the vanes and particularly upon the inner faces thereof.

2

Referring now particularly to Figs. 3, 4 and 5. A die stamping, as shown in Fig. 5, is formed with a main fish-like body 18 with laterally and rearwardly extending projections 19 and 20 adapted when curved in the manner as shown in Fig. 3 to provide the vanes. The projections 19 and 20 are respectively bent in opposite directions to extend from the opposite sides of the body 18 and also bent to extend in opposite directions at the rear of the body 18 to provide respectively downwardly and upwardly curved ends of the projections. These ends, like in the construction shown in Figs. 1 and 2, extend above the upper and lower edges of the rear part of the main body 10. An opening is provided in the rear end of the body as indicated at 21 for receiving a ring 22 to which a triple fish hook 23 is connected.

In Fig. 6, there is shown a slight modification wherein the vanes 19 and 20 are pulled slightly away from the sides of the body to provide spaces 24 and 25 respectively through which the water can pass whereby to be certain that the full width of the vane is effective to cause the spinning action.

While various changes may be made in the detail construction, it shall be understood that such changes shall be within the spirit and scope of the present invention as defined by the appended claims.

Having thus set forth and disclosed the nature of our invention, what is claimed is:

1. An artificial minnow comprising a relatively thin, flat body part shaped to correspond to the shape of a living minnow, and oppositely and laterally turned vanes attached at their forward ends to the upper and lower edges of said body part, said vanes extending rearwardly of said body part and having their rear extremities curved downwardly and upwardly, respectively, along the sides of said body part and terminating below the lower and upper edges, respectively, of said body part.

2. An artificial minnow comprising a relatively thin, flat body part shaped to correspond to the shape of a living minnow and having a tail portion, and oppositely and laterally turned vanes, attached at their forward ends to the upper and lower edges of said body part, said vanes extending rearwardly at said body part with portions thereof in spaced relation from the sides thereof and having their rear extremities curved downwardly and upwardly, respectively, along the sides of said body part and terminating below the lower and upper edges, respectively, of said body part adjacent said tail portion.

LAWRENCE TONY PARETI.
ALEXANDER MANISTA.

REFERENCES CITED

The following references are of record in the file of this patent:

UNITED STATES PATENTS

| Number | Name | Date |
|---|---|---|
| 760,028 | Shulean | May 17, 1904 |
| 2,223,591 | Andersson | Dec. 3, 1940 |